United States Patent
Biedscheid

(10) Patent No.: US 9,272,773 B2
(45) Date of Patent: Mar. 1, 2016

(54) APPARATUS AND METHODS TO OPERATE LAMINAR FLOW CONTROL DOORS

(71) Applicant: The Boeing Company, Chicago, IL (US)

(72) Inventor: Rick A. Biedscheid, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 157 days.

(21) Appl. No.: 14/036,992

(22) Filed: Sep. 25, 2013

(65) Prior Publication Data

US 2015/0083866 A1 Mar. 26, 2015

(51) Int. Cl.
| | |
|---|---|
| B64C 21/06 | (2006.01) |
| B64C 21/04 | (2006.01) |
| B64C 5/06 | (2006.01) |
| B64D 47/08 | (2006.01) |
| B64C 21/08 | (2006.01) |

(52) U.S. Cl.
CPC . *B64C 21/06* (2013.01); *B64C 5/06* (2013.01); *B64C 21/04* (2013.01); *B64C 21/08* (2013.01); *B64D 47/08* (2013.01); *B64C 2230/04* (2013.01); *B64C 2230/06* (2013.01)

(58) Field of Classification Search
CPC ............. B64D 2033/0213; B64D 2033/0226; B64C 1/14; B64C 1/1407; B64C 21/02; B64C 21/00; B64C 23/06; B64C 23/00; B64C 21/04; B64C 21/06; B64C 21/08; B64C 5/06
See application file for complete search history.

(56) References Cited

U.S. PATENT DOCUMENTS

| | | | | | |
|---|---|---|---|---|---|
| 2,003,223 | A | * | 5/1935 | Rose | ............................ 244/204 |
| 2,646,945 | A | * | 7/1953 | Perry | ................... B64C 21/025 |
| | | | | | 244/204 |

(Continued)

FOREIGN PATENT DOCUMENTS

| | | | | |
|---|---|---|---|---|
| EP | 1479734 | A1 * | 11/2004 | ............... C09D 4/00 |
| EP | 2208669 | | 7/2010 | |

(Continued)

OTHER PUBLICATIONS

Wikipedia, Servomechanism webpage. Archived by Internet Archive, https://web.archive.org/web/20110920095739/http://en.wikipedia.org/wiki/Servomechanism on Sep. 20, 2011, accessed Jun. 8, 2015.*

(Continued)

*Primary Examiner* — Tien Dinh
*Assistant Examiner* — Alexander V Giczy
(74) *Attorney, Agent, or Firm* — Hanley, Flight & Zimmerman, LLC

(57) ABSTRACT

Apparatus and methods to operate laminar flow control system doors are described. One described example apparatus includes an outboard structure of an aircraft, a first door assembly on a first side of the outboard structure having a first door defining a first opening and a second door assembly on a second side of the outboard structure having a second door defining a second opening. The example apparatus also includes a perforated surface proximate a leading edge of the outboard structure and an actuator disposed in the aircraft. The actuator drives first and second linkages that couple the first and second doors to the actuator. The first and second linkages are to operate the first and second doors, respectively, in an open mode in which the first and second openings create an airflow path between the perforated surface and the first and second openings.

17 Claims, 12 Drawing Sheets

(56) References Cited

U.S. PATENT DOCUMENTS

| | | | |
|---|---|---|---|
| 2,686,020 A * | 8/1954 | Wandscheer | 244/204 |
| 2,987,277 A * | 6/1961 | Richardson et al. | 244/90 R |
| 3,489,377 A * | 1/1970 | Wright et al. | 219/85.15 |
| 4,356,973 A * | 11/1982 | Lawson | 239/265.31 |
| 5,209,057 A * | 5/1993 | Remlaoui | 60/226.2 |
| 5,213,286 A * | 5/1993 | Elliott et al. | 244/129.4 |
| 5,908,175 A * | 6/1999 | Magnes | 244/119 |
| 6,349,899 B1 * | 2/2002 | Ralston | B64D 33/02 244/53 B |
| 7,866,609 B2 | 1/2011 | Parikh | |
| 8,128,037 B2 | 3/2012 | Powell et al. | |
| 8,245,976 B2 | 8/2012 | Sakurai et al. | |
| 8,282,042 B2 | 10/2012 | Parikh et al. | |
| 8,354,968 B1 | 1/2013 | Paulsen et al. | |
| 8,393,578 B2 | 3/2013 | Parikh et al. | |

FOREIGN PATENT DOCUMENTS

| | | |
|---|---|---|
| GB | 2398771 | 9/2004 |
| WO | 2009085418 | 7/2009 |

OTHER PUBLICATIONS

European Patent Office, "Extended European Search Report," issued in connection with European Patent Application No. 14185912.4, issued on Feb. 16, 2015, 7 pages.

Albert L. Braslow, "A History of Suction-Type Laminar-Flow Control with Emphasis on Flight Research," Monographs in Aerospace History Number 13, 1999, 84 pages. The particular month is not in issue because the year of publication is sufficiently earlier than the effective U.S. filing date and any foreign priority.

Young et al., "Investigation of hybrid laminar flow control (HLFC) surfaces," Aircraft Design 4, Jun. 2001, 127-146, 20 pages.

Berry et al., "787-9 Empennage HLFX Development and Application," Boeing BTEC20: Mobilizing Technology, Accelerating the Connection of Existing and Emerging Technology for New Applications, presented Jul. 23-25, 2013, 33 pages.

C-130/L-382 HF Shunt Antenna Modification, www.asbavionics.com/projects/pdf/herc_hf_shunt_flyer.pdf, last modified date Oct. 20, 2011, 1 page.

Joseph R. Chambers, "Laminar-Flow Control: The Holy Grail of Aerodynamics," Innovation in Flight: Research of the NASA Langley Research Center on Revolutionary Advanced Concepts for Aeronautics, dated Aug. 22, 2005, 100 pages.

Ronald D. Joslin, "Overview of Laminar Flow Control," NASA/TP-1998-208705, dated Oct. 1998, 142 pages.

* cited by examiner

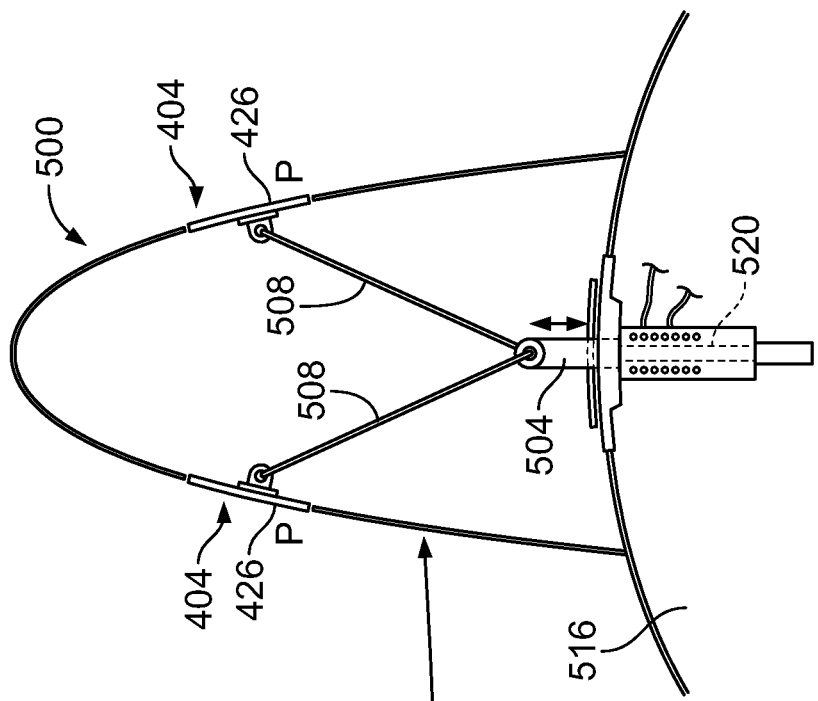
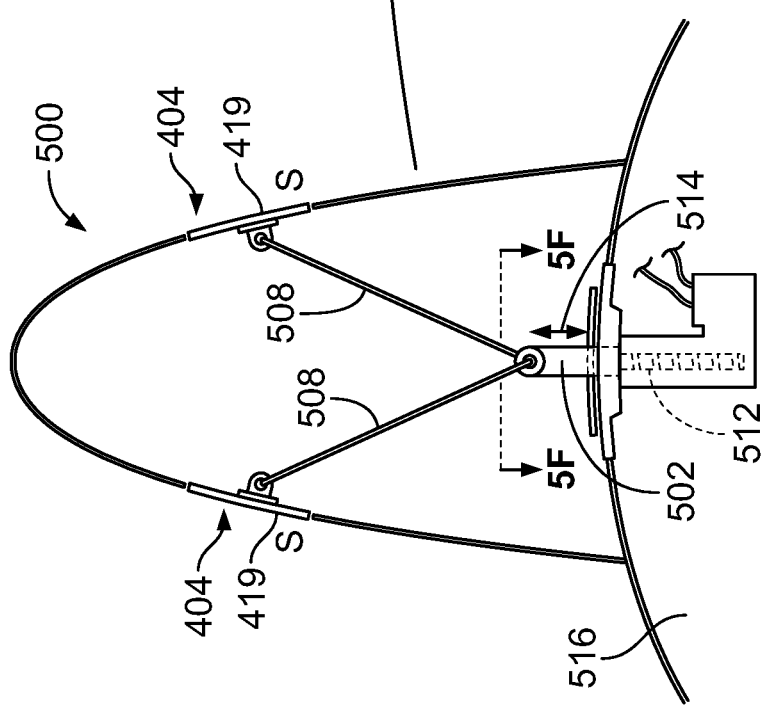
FIG. 5C
FIG. 5B

FIG. 5E     FIG. 5D

Free State of Door Assembly Outside of Fairing Panel

APPARATUS AND METHODS TO OPERATE LAMINAR FLOW CONTROL DOORS

FIELD OF THE DISCLOSURE

This patent relates generally to aircraft and, more particularly, to apparatus and methods to operate laminar flow control doors.

BACKGROUND

Horizontal and vertical stabilizers or fins may be used in aircraft to provide directional stability and control. Typically, these stabilizers are located in an empennage portion (e.g., tail assembly) of the aircraft. Geometry and characteristics of these components and other structures on the exterior of the fuselage can have significant effects on the aerodynamic characteristics of the aircraft including drag coefficient and turbulence. These characteristics can also impact fuel economy and carbon-dioxide ($CO_2$) emissions.

SUMMARY

One described example apparatus includes a fin of an aircraft, a door assembly on a first side of the fin having a first door defining a first opening and second door defining a second opening. The example apparatus also includes a perforated surface proximate a leading edge of the fin and an actuator disposed in the aircraft. The actuator drives a linkage that couples the door to the actuator. The linkage is to operate the door in a first open mode in which the first opening faces in a first direction to create a suction airflow path between the perforated surface and the first opening, and a second open mode in which the second opening faces in a second direction to create a purge airflow path between the second opening and the perforated surface.

Another described example apparatus includes an aircraft structure disposed outboard a fuselage, a perforated surface defining an opening and proximate a leading edge of the structure, and a plurality of doors on the structure. Each of the door assemblies is to have a plurality of doors and to have a first open mode to at least one door to have a respective first opening facing a direction substantially towards a rear of the aircraft, and each of the door assemblies to have a second open mode to open at least one door to have a respective second opening facing in a direction substantially towards a front of the aircraft. The example apparatus also includes an actuator disposed in the aircraft and operatively coupled to a linkage. The linkage is coupled to the door assemblies and the actuator is to control the doors via the linkage to open the doors into the first and second modes. The first mode defines a suction airflow path between the perforated surface and the first opening. The second mode defines a purge airflow path between the second opening and the perforated surface.

One described example method includes determining an operational condition of an aircraft. The aircraft has a door assembly on an outboard structure of the aircraft. If the operational condition corresponds to a first condition, an actuator in the aircraft operates, via a linkage, the door assembly in a first mode. The first mode defines a first opening in a first direction to define a purge airflow path from the first opening and through a perforated surface to purge the perforated surface. If the operational condition corresponds to a second condition, the actuator operates, via the linkage, the door assembly in a second mode. The second mode defines a second opening in a second direction to define a suction airflow path from the perforated surface to the second opening.

BRIEF DESCRIPTION OF THE DRAWINGS

FIG. 5B is a cross-sectional front view of the linkage system of FIG. 5A

FIG. 5C is another cross-sectional front view of the linkage system of FIG. 5A.

FIGS. 5D, 5E and 5F depict a shaft of the linkage system 500 of FIGS. 5A, 5B and 5C.

Figure 1:
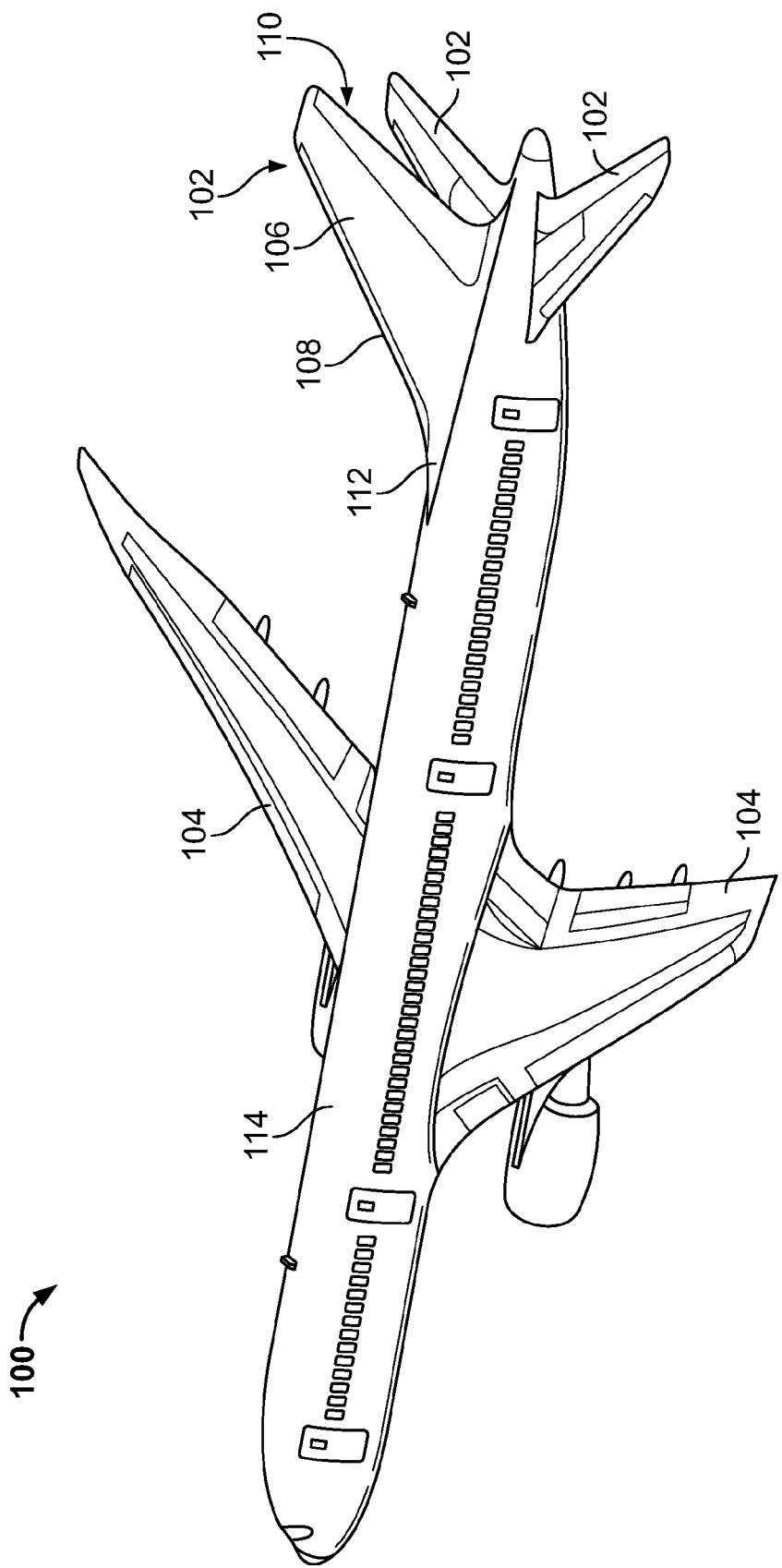
FIG. 1 illustrates an example aircraft in which the examples disclosed herein can be implemented.

Wherever possible, the same reference numbers will be used throughout the drawing(s) and accompanying written description to refer to the same or like parts. As used in this disclosure, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Apparatus to improve reliability and serviceability, and to reduce complexity and turbulence of a laminar flow control system for an aircraft are described herein. Laminar flow control systems of a fin generally use suction to draw turbulent air from an inlet into a duct to cause the air to move through an exit opening to reduce the turbulence of the air adjacent to the fin which, in turn, reduces the overall drag coefficient of the aircraft. Drag coefficient reduction can improve fuel economy of the aircraft and, therefore, reduce fuel costs and carbon-dioxide ($CO_2$) emissions. Many known laminar flow control systems employ turbo machinery or a compressor to draw turbulent air through the inlet. Passive systems, in contrast, use pressure differentials between the inlet and outlet to drive the flow of air. Some passive systems employ a door opened in a first direction to engage a suction airflow between a perforated inlet and the door. Additionally, the door may be actuated in another direction to purge the inlet by engaging a flow path between the door and the perforated surface. The door may be actuated via servos within the fin, but assembly and maintenance of the servos is complex and expensive. Additionally, the inlet perforations may require additional maintenance to prevent corrosion and maintain system performance.

In accordance with the teachings of this disclosure, an example laminar flow control system may implement door assemblies, which may be located in a fin and actuated from within the fuselage of an aircraft. A leading edge of the fin may contain perforations, which allow air to move into the fin. An actuator drives a linkage to open the door assemblies into first and second open modes. The door assemblies opened in the first open mode allow air to flow into the perforations and to the door assemblies via a suction airflow path. Additionally, the door assemblies opened in the second open mode allow the air to flow from the door assemblies and out of the perforated surface to purge the perforated surface of foreign matter or liquids. The door assemblies may be actuated by a servo or a hand crank. In some examples, the linkage between the actuator and the door assemblies may include shafts coupled to control rods. Alternatively, the linkage may include a rack and pinion. In other examples, a nano-coating may be applied to the perforated surface and/or a forward surface of an auxiliary spar proximate the perforated surface to further increase corrosion resistance of the system and improve overall reliability. The nano-coating may also prevent matter from being trapped in the perforations. Additionally or alternatively, a gaster bump may be added to the leading edge to substantially eliminate the turbulence of the airflow and establish an attachment line from which laminar flow can form. In some examples, a camera may be used to monitor or broadcast the operation of the door assemblies.

The example apparatus eliminates the need to place multiple servos in the fin (i.e., reducing cost, part count, and weight related to the servos), which reduces the need to access the fin for maintenance or repair of the servos, which can often require a large number of fasteners (e.g., 66) to be removed to gain access. In contrast, the example apparatus requires only a single actuator (e.g., a servo or a hand crank) to be mounted in the fuselage to operate the door(s) via a linkage. Placement of the single servo in the fuselage instead of the fin improves serviceability and reduces overall design complexity because placement within the fin requires mounting components and wiring routed into the fin. The reduction in parts that results from placement of the servo in the fuselage also helps improve manufacturability because less assembly time and effort is needed due to easier access to the servos. Because no special lifts are needed to access the servo in the fuselage, accessibility for manufacturing and service is improved.

The example laminar flow control system may also improve turbulence reduction. The example apparatus allows an increase of the perforated inlet area and the addition of a gaster bump. Additionally, the nano-coating mentioned above may prevent matter from being trapped in the perforations to further improve turbulence reduction.

The example apparatus also allows some of the high frequency radio ("HF") equipment including HF couplers, etc. to be located in the fuselage and away from the fin, which further improves HF system performance by utilizing shorter feed lines, and results in reduced weight of the aircraft. Additionally, placement of the HF equipment in the fuselage improves manufacturability and access for service or maintenance.

FIG. 1 illustrates an example aircraft 100 having fins 102 and wings 104 in which the examples described herein can be implemented. A vertical fin 106 has a leading edge 108 and a trailing edge 110, and is adjacent to a dorsal fairing 112. The laminar flow control system described herein may lower aerodynamic drag encountered during flight and may be applied to any of the fins 102, the wings 104 and/or any other exterior or outboard structure (e.g., a horizontal stabilizer, a wing strut, an engine strut, a canard stabilizer, etc.) of a fuselage 114. The leading edge 108 and other surfaces of the aircraft 100 may encounter turbulent air flow. Increased turbulence results in a higher drag coefficient of the aircraft 100, thereby negatively affecting the overall fuel economy of the aircraft 100.

Figure 2:
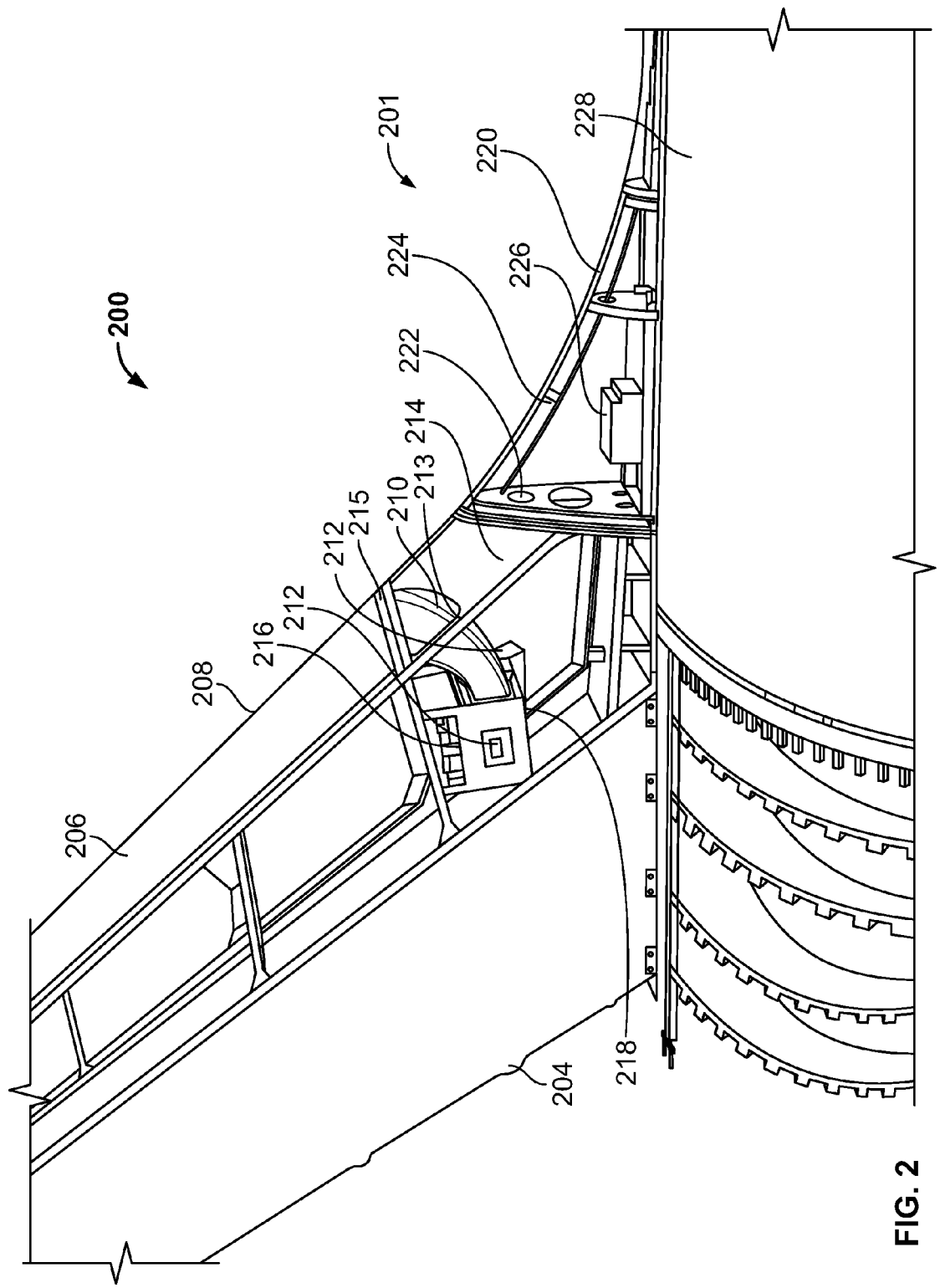
FIG. 2 is a cross-sectional view of an example laminar flow control system.

FIG. 2 is a cross-sectional view of an example laminar flow control system 200 of an aircraft 201. A vertical fin 204 contains a ruled surface 206, which defines a leading edge 208 of the vertical fin 204. The ruled surface 206 contains perforations to allow the intake of air. The air flows through the perforations on the ruled surface 206 into a duct 210, which leads to a pair of door assemblies 212 mounted to opposing sides of the vertical fin 204. The door assemblies 212 may be a known door system such as described in U.S. Pat. No. 8,245,976, which is incorporated by reference in its entirety. This door system includes a first door to form part of a cowl in a second door, in which the first and second doors open in opposite directions. The duct 210 passes through an opening 213 of an aux spar 214. The door assemblies 212 operate in a first mode in which their openings face in a direction substantially towards the rear of the aircraft 201 to form a suction airflow between the perforations in the ruled surface 206 and the door assembly 212, thereby reducing turbulence encountered by the aircraft 201. The locations of the door assemblies 212 in the vertical fin 204 limit the perforated area on the ruled surface 206 to a seam 215. The first mode (e.g., a suction mode), which reduces the turbulence of the air at the vertical fin 204 and allows laminar flow to occur from leading edge portions of the vertical fin 204, may occur during cruising of the aircraft 201 or any other appropriate scenario. Additionally, the door assemblies 212 may also operate in a second mode, in which the openings face in a direction substantially towards the front of the aircraft 201 to purge liquids and other foreign matter from the perforations (e.g., a purge mode). This purging of the perforations may occur during takeoff of the aircraft or any other appropriate scenario.

The door assemblies 212 are actuated by respective servos 216 into the first and second modes. Accordingly, the necessary wiring is routed to the servos 216. In this example, each door assembly 212 is operated by a respective servo 216. Therefore, two servos 216 are required for this configuration. Mounting brackets 218 are also used to mount the door assemblies 212 and the servos 216. The mounting brackets 218 are relatively complex and require numerous fasteners (e.g., 66) to align the necessary components to actuate the door assemblies 212. Additionally, maintenance and service of the servos 216 can be time-intensive and laborious because of the large number of fasteners required to secure the panels of the fin 204 and the limited access to reach the vertical fin 204 (e.g., special lifts needed to access the vertical fin 204). The servos 216 also require cabling that is routed into the vertical fin 204.

A dorsal fairing 220 is separated from the vertical fin 204 by a closeout rib 222. The dorsal fairing 220 contains an HF antenna 224 and an HF coupler 226. In this example, the cables to the HF coupler 226 penetrate a substantially sealed fuselage 228 of the aircraft 201 and travel through the vertical fin 204 to connect to the HF coupler 226. Positioning the door assemblies 212 in the vertical fin 204 instead of the dorsal fairing 220 requires the duct 210 to redirect the flow of air between the perforations of the ruled surface 206 and the door assemblies 212.

Figure 3:
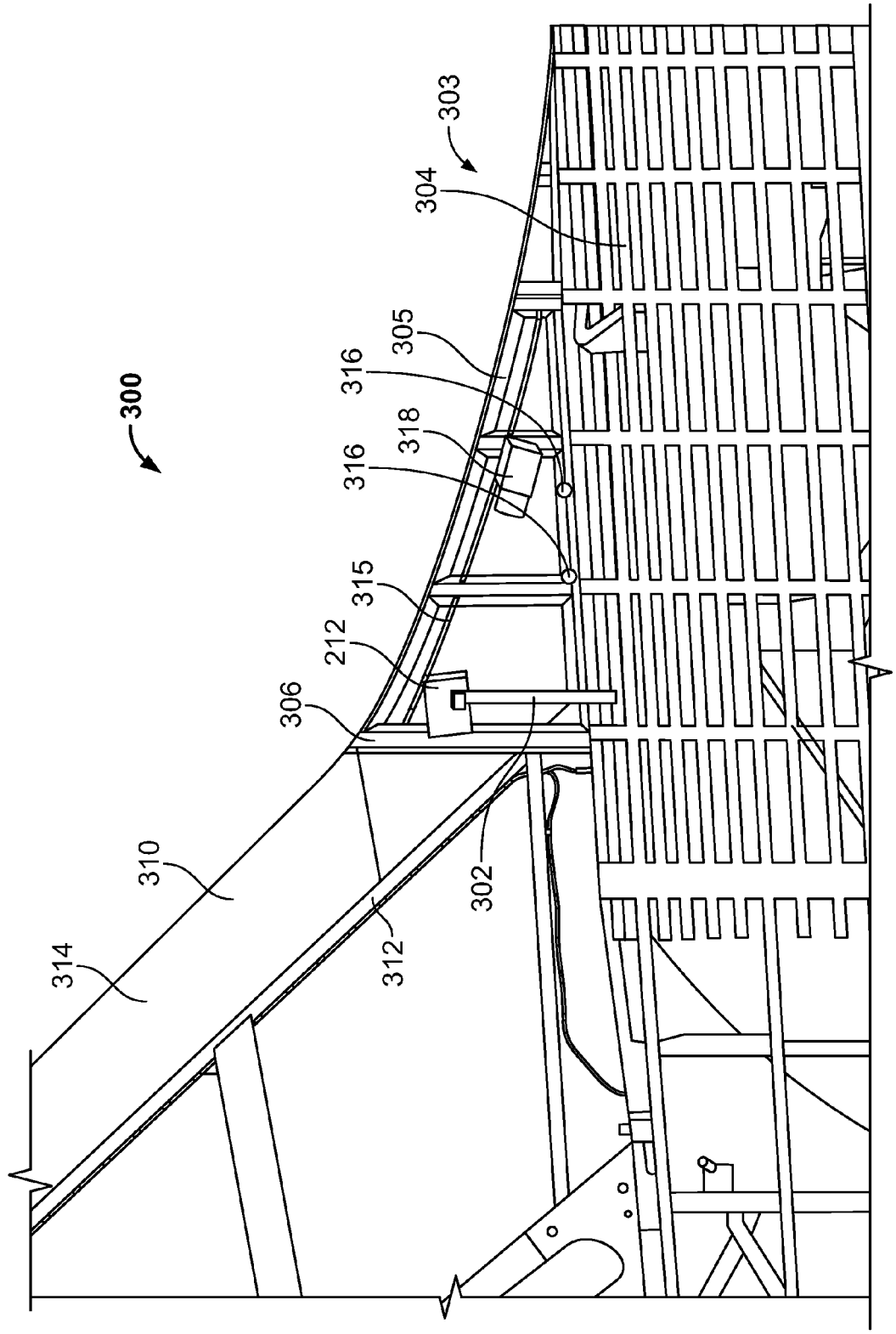
FIG. 3 is a cross-sectional view of another example laminar flow control system in accordance with the teachings of this disclosure.

FIG. 3 is a cross-sectional view of an example laminar flow control system 300 in accordance with the teachings of this disclosure. In this example, the door assemblies 212 are connected to a linkage 302, which couples the door assemblies 212 to an actuator (not shown) in a fuselage 304 of an aircraft 303. Although the door assemblies 212 are shown as located on a dorsal fairing 305, they may be located in any appropriate fin, wing or structure. Similar to the laminar flow control system 200, a closeout rib 306, which may not be present, separates the dorsal fairing 305 and a vertical fin 310. An aux spar 312 provides a structural support for a ruled surface 314, which has perforations. In this example, the closeout rib 306 contains an opening to allow airflow between the perforations in the ruled surface 314 and the door assemblies 212. Additionally, the area of the perforations may be extended to the closeout rib 306 instead of the seam 214 (as shown in FIG. 2), thereby allowing greater surface area for the perforations than the laminar flow control system 200, which may result in reduced aerodynamic drag. Additionally, the example laminar flow control system 300 does not require the duct 210 or the opening 213 of the aux spar 312 (as shown in FIG. 2) because of the placement of the door assemblies 212 (i.e., the airflow no longer has to be redirected). The door assemblies 212 may be made of aluminum alloy, plastic, fiberglass, and/or any other appropriate material. Utilizing a fiberglass door assembly 212 instead of metal may result in improved RF performance of a high frequency ("HF") antenna 315. The dorsal fairing 305 may also include weep holes 316 proximate the fuselage 304 to allow moisture to drain to the exterior of the aircraft 303. Although the door assemblies 212 are shown by way of example, dual opposing opening doors described below in connection with FIGS. 8A, 8B and 8C may be used instead. Perforations for the laminar flow control system 300 may also be located at any appropriate position of the aircraft 303.

The example laminar flow control system 300 may also include a camera 318 to monitor operation of the door assemblies 212. The camera 318 may be any suitable type of camera (e.g., wireless, wired, battery-operated, etc.) and use any appropriate interface to broadcast a video signal including IEEE 802.11, Ethernet, Bluetooth™, etc. The camera 318 may be used by the crew to monitor door operations (e.g., verify proper operation and actuation of the door assemblies 212) or as part of an inflight-entertainment system where passengers may learn about topics related to plane fuel economy, laminar flow, etc. and general operation of the door assemblies 212.

Figure 4:
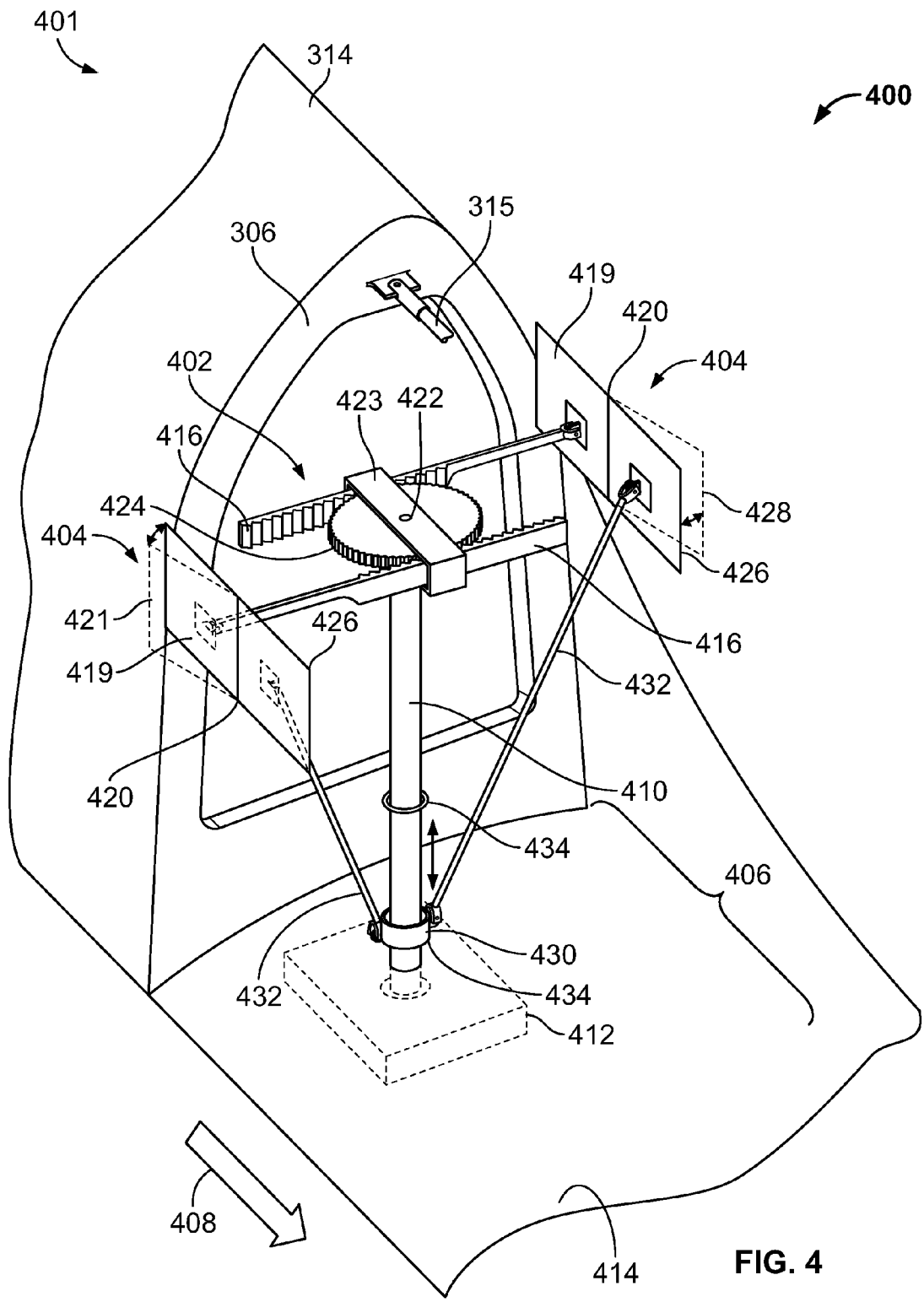
FIG. 4 depicts an example linkage system of an aircraft.

FIG. 4 depicts a linkage system 400 of an aircraft 401. A rack and pinion 402 operates door assemblies 404 which, in this example, are located in a dorsal fairing 406. The door assemblies 404 may be located in any appropriate fin, wing or structure of the aircraft 401. An arrow 408 indicates the front of the aircraft 401. A shaft 410 couples an actuator 412 in a fuselage 414 to the rack and pinion 402. Rotation of the shaft 410 in a first direction transfers rotary movement from the actuator 412 to the rack and pinion 402 to cause each rack 416, which is coupled to a scupper door 419 of the door assembly 404, to rotate the scupper door 419 about a hinge line 420 into a suction position 421 (e.g., a 30 degree opening for the suction mode shown in dashed lines as the position 421 or any other appropriate position) and creating an airflow path between the perforated surface in the leading edge 314 and the scupper doors 419.

A keeper 423, which may be attached or integral to the closeout rib 306, holds the racks 416 to move substantially in a plane along their longitudinal axes and may also contain a bearing 422 to rotatably secure a pinion 424 of the rack and pinion 402. Alternatively, the bearing 422 may be located in the pinion 424 and couple to the keeper 423 through a fastener, a pin, or any other appropriate coupling.

To place purge doors 426 of the door assemblies 404 into a purge position 428, a solenoid 430 may move along the axis of the shaft 410 causing control rods 432 to displace, thereby causing the purge doors 426 to rotate about the hinge lines 420 into the purge position 428 (e.g., a 45 degree opening for the purge mode shown in dashed lines as the position 428 or any other appropriate position). The solenoid 430 may be displacement limited by stops 434. Alternatively, the rack and pinion 402 may be configured to operate both doors 419, 426 of the door assemblies 404, or the solenoid 430 may operate the scupper doors 419 of the door assemblies 404, and the rack and pinion 402 may operate the purge doors 426 of the door assemblies 404. Any combination of the rack and pinion 402 and the solenoid 430 may be used. The rack and pinion 402 may comprise polyether ether ketone ("PEEK"), metal, other polymers, or any other suitable material. Utilization of the PEEK rack and pinion 402 instead of metal may improve the RF performance of the HF antenna 315. Although the door assemblies 404 are shown, the door assemblies 212 may be used instead and operated by the rack and pinion 402 and/or the solenoid 430.

The scupper doors 419 and the purge doors 426 of the door assemblies 404 may be biased to a default closed position by a spring or other biasing element as described below in connection with FIGS. 8A, 8B and 8C. In this example, the door assemblies 404 are used. However, the door assemblies 212 may be used instead. The door assemblies 404 may be made of aluminum alloy, plastic, fiberglass, or any other appropriate material. Any of the features described in connection with the door assemblies 404 may be applied to the door assemblies 212. Likewise, any of the features described in connection with the door assemblies 212 may be applied to the door assemblies 404.

Figure 5A:
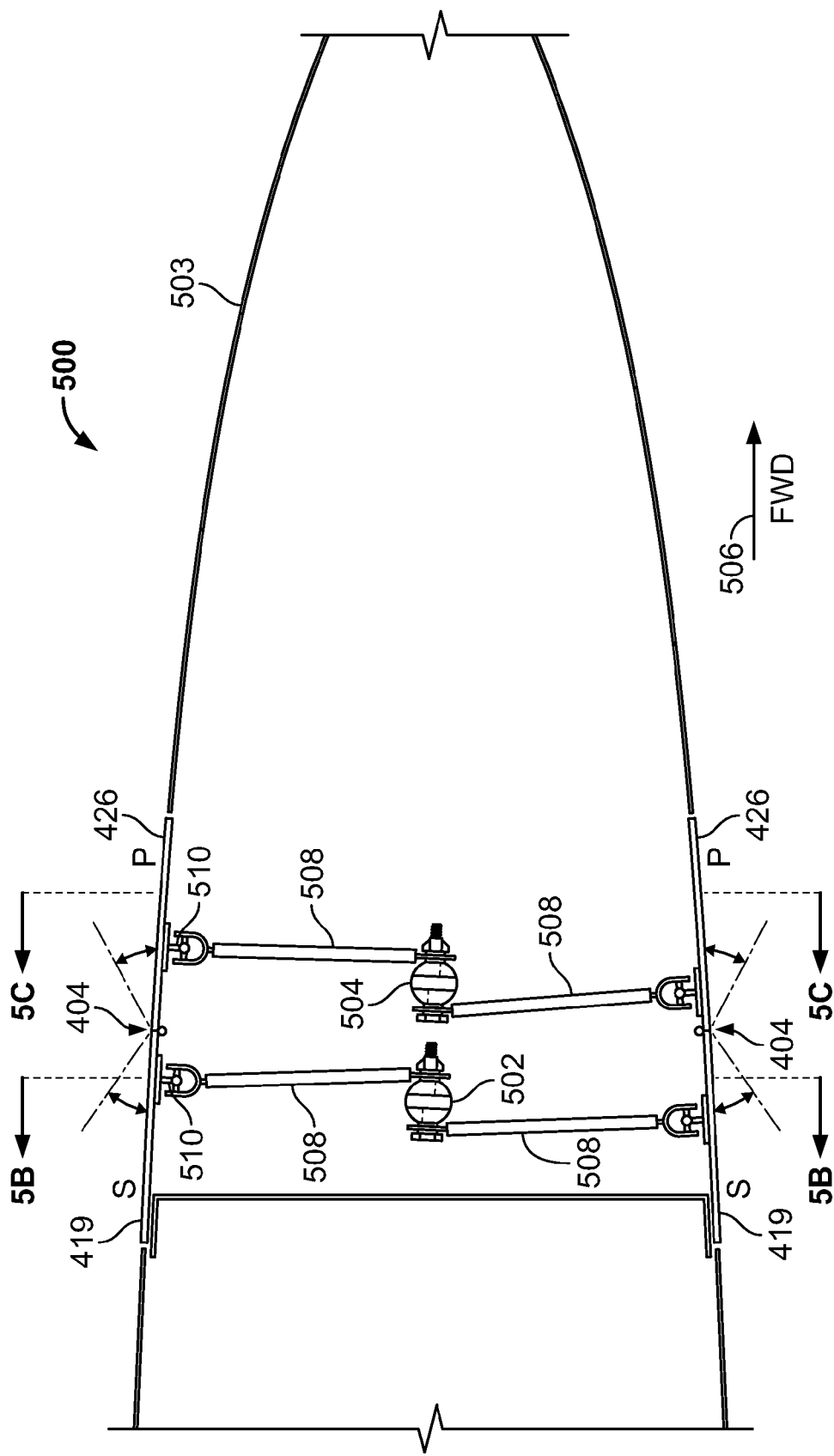
FIG. 5A is a cross-sectional top view of an alternate linkage system of an aircraft having a linear actuator and a solenoid.

FIG. 5A is a cross-sectional top view of an alternate linkage system 500 of an aircraft 501 having a shaft (e.g., stem) 502, which may be pushed from a linear actuator 512 shown in FIG. 5B, and a shaft 504, which may be moved by a push solenoid 520 shown in FIG. 5C. An arrow 506 indicates the front of the aircraft 501. In this example, the linkage system 500 is located in a dorsal fairing 503. The scupper doors 419 and the purge doors 426 are moved by the linear actuator 512 and the push solenoid 520 via the shafts 502 and 504, and control rods 508. The control rods 508 may couple to the scupper doors 419 and the purge doors 426 at joints 510, which may be ball joints or rotational joints or any other type of appropriate joints.

FIG. 5B is a cross-sectional frontal view of the linkage system 500 of FIG. 5A. In this example, a shaft 502 moves along a direction indicated by an arrow 514. The push actuator 512 in a fuselage 516 moves the shaft 502, thereby moving the control rods 508 to operate the scupper doors 419 of the door assemblies 404. The push actuator 512 may be integral with the shaft 502 and pass through an opening in the fuselage 516.

FIG. 5C is another cross-sectional front view of the linkage system 500 of FIG. 5A. The push solenoid 520 moves the control rods 508 to operate the purge doors 426 of the door assemblies 404. Like the push actuator 512, the push solenoid 520 may also have a shaft 504, which passes through an opening in the fuselage 516.

Figure 5F:
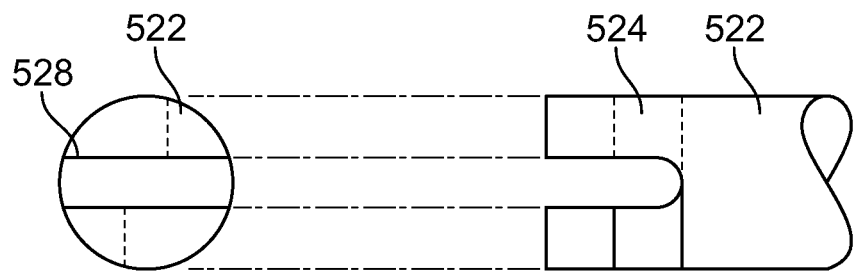
Figure 5F:
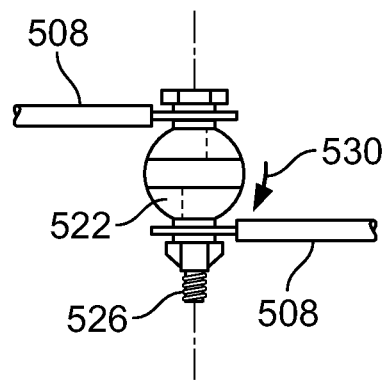

FIGS. 5D, 5E and 5F depict a shaft 522, which may be integral to the actuator 512 and/or the push solenoid 520 of the linkage system 500 of FIGS. 5A, 5B and 5C. The shaft 522 may have an opening 524 to accept a control rod bolt 526. An opening 528, which may be keyed 90 degrees to the opening 524, may allow the shaft 522 and/or the actuator 512 to be disconnected from the control rods 508 when the shaft 522 and/or the actuator 512 is rotated in a direction indicated by an arrow 530. Likewise, the push solenoid 520 may be disconnected from the control rods 508 when the shaft 522 and/or the push solenoid 520 is rotated in the direction indicated by the arrow 530.

Figure 6:
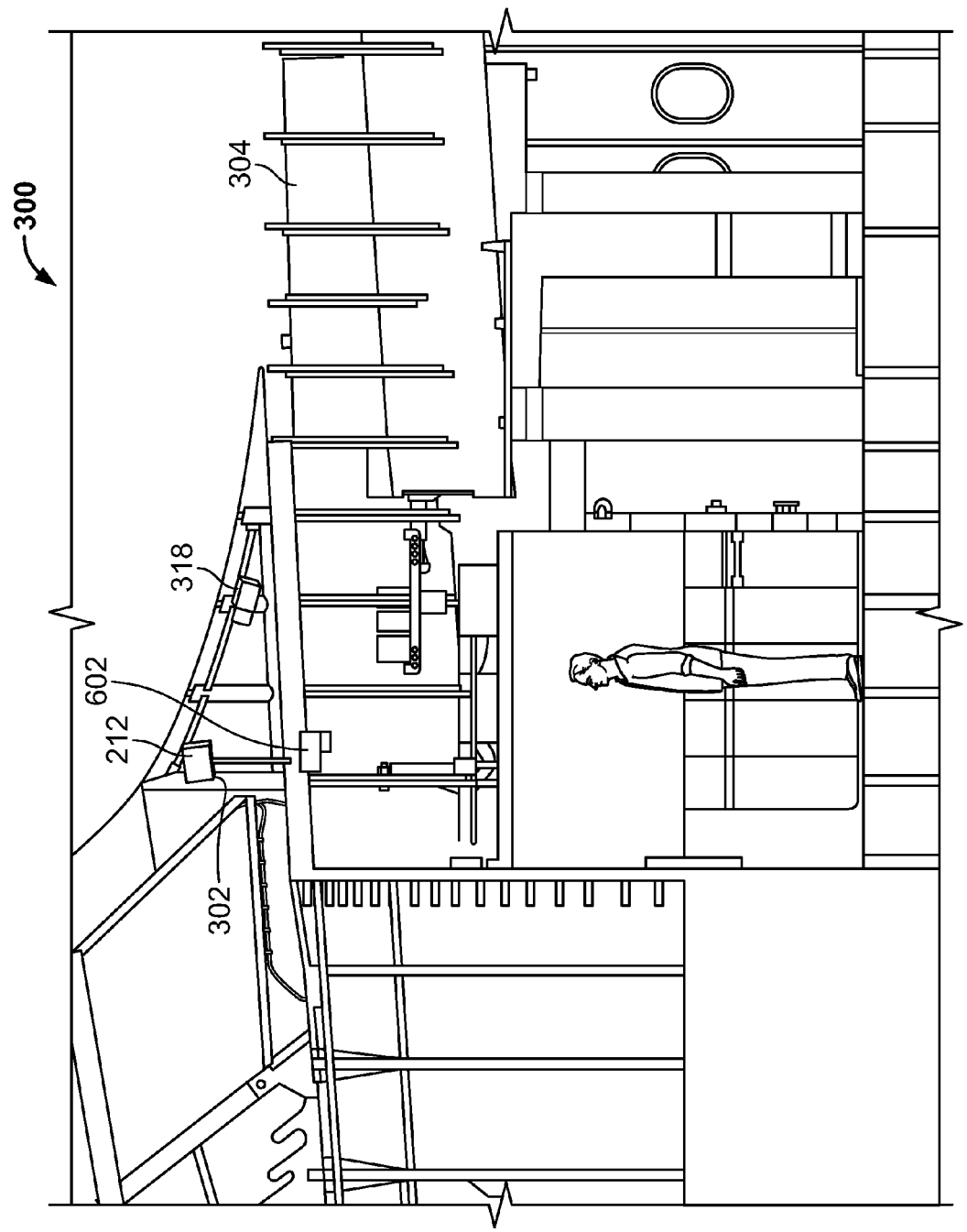
FIGS. 6 and 7 depict cross-sectional views of the example laminar flow control system of FIG. 3.
Figure 7:
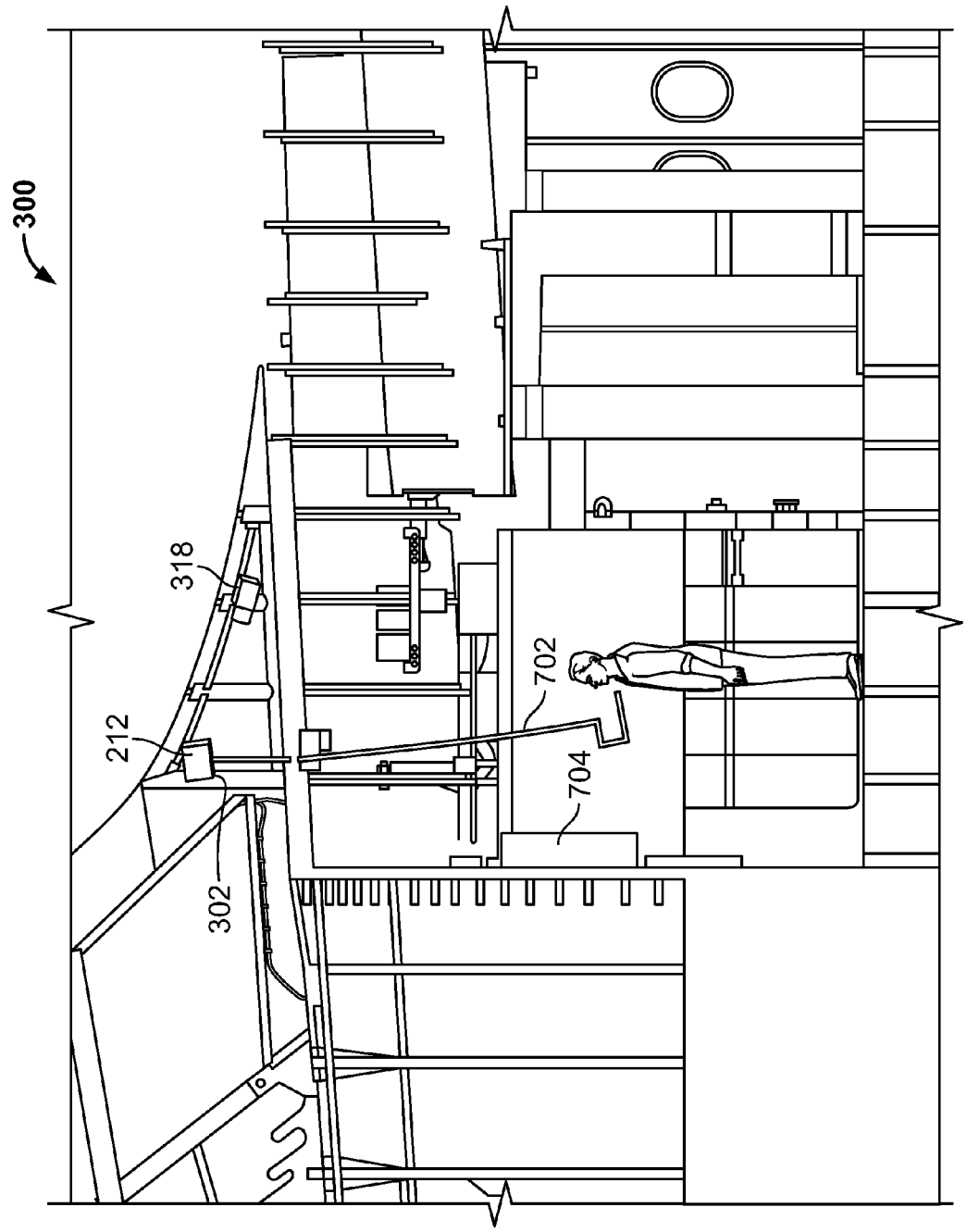

FIGS. 6 and 7 depict cross-sectional views of the example laminar flow control system 300 of FIG. 3. FIG. 6 depicts a single servo 602 mounted within the fuselage 304. In contrast to the laminar flow control system 200, which requires two servos, only a single servo is required to operate the door assemblies 212 in the laminar flow control system 300. The linkage 302 transfers the movement of the servo 602 to the door assemblies 212. In some examples, the servo 602 may be linked to an automated flight control system. The flight control system may be programmed to operate the servo 602 automatically, thereby controlling the door assemblies 212 into the purge mode during takeoff and the suction mode during cruise. Accordingly, the control system may operate through sensors, software and/or other electronics to operate the door assemblies 212 in the appropriate modes and corresponding angles. Although, the operation of the door assemblies 212 may be automated via the flight control system, the camera 318 may be used to view the door assemblies 212. FIG. 7 depicts a similar view to FIG. 6, but shows a hand crank 702, by which a user is able to manually operate the door assemblies 212. In this example, the user may be viewing the current status of the door assemblies 212 on a viewing screen 704 via the camera 318. The hand crank 702 may be turned in a simple circular motion and/or a reciprocating motion. Although the door assemblies 212 and the linkage 302 are shown in FIGS. 6 and 7, the door assemblies 404 and/or the linkage systems 400, 500 may be used instead. Alternatively, the hand crank 702 may operate a single set of the scupper doors 419 without the presence of the purge doors 426 (the doors 419 and 426 are shown in connection with FIGS. 4, 5A, 8A and 8B).

Figure 8A:
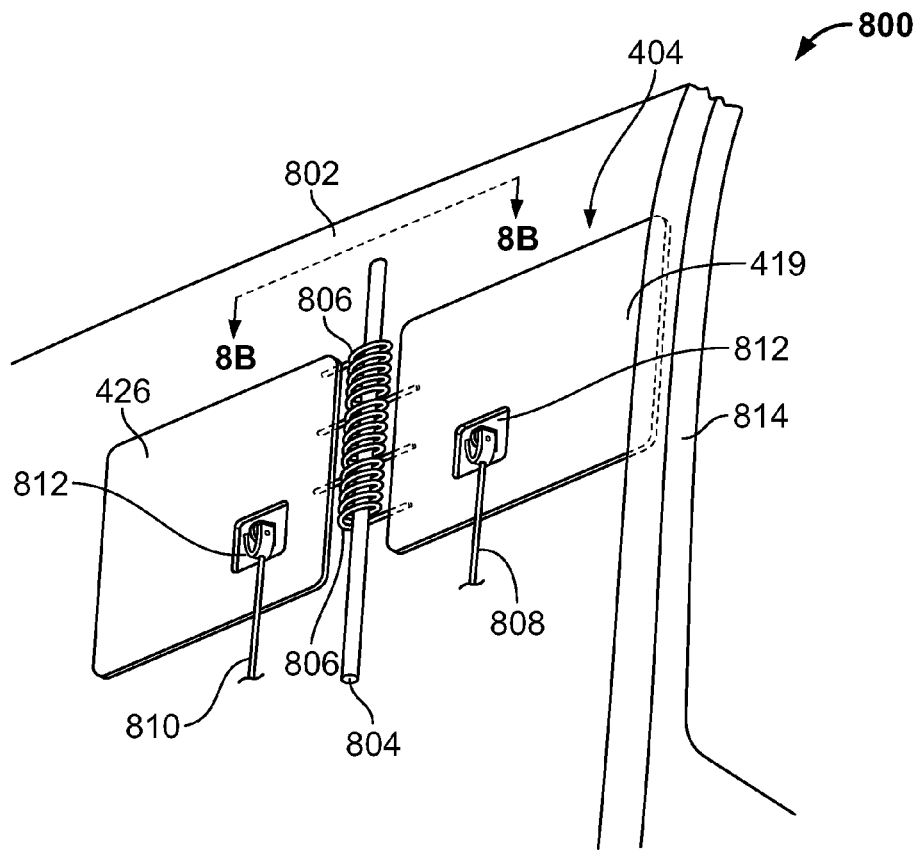
FIG. 8A is an enlarged view of the door assembly of an aircraft.

FIG. 8A is an enlarged view of the door assembly 404 of an aircraft 800. In this example, the door assembly 404 is located on a dorsal fairing 802. The door assembly 404 has the scupper door 419 and the purge door 426 described in connection with FIG. 4, which hinge about a support rod 804. The rotation of the doors 419, 426 is biased by springs 806, which may be torsional springs or any other appropriate type of spring. The scupper door 419 is operated into the suction position by a control rod 808. Similarly, the purge door 426 is operated into the purge position by a control rod 810. The control rods 808, 810 are attached to the doors 419, 426 via control rod fittings 812, which may be ball joints or any other appropriate type of joint. In this example the door assembly 404 is located close to a closeout rib 814, however, as discussed above, the door assembly 404 may be located on any appropriate outboard structure of the aircraft 800.

Figure 8B:
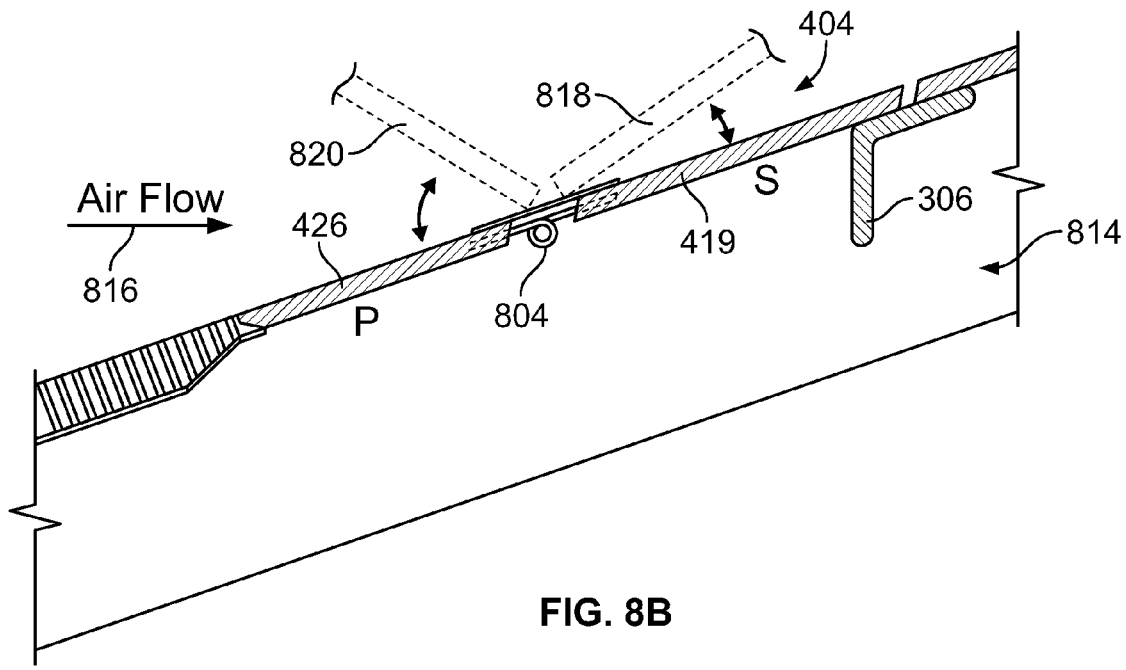
FIG. 8B is a cross-sectional view of the door assembly shown in FIG. 8A.

FIG. 8B is a cross-sectional view of the door assembly 404 shown in FIG. 8A. Arrows 816 depict a direction of airflow past an aircraft 800. The scupper door 419 may rotate about the support rod 804 into position 818 (shown by the dotted lines) in the suction mode. Likewise, the purge door 426 may rotate into position 820 (shown by the dotted lines) in the purge mode. The scupper door 419 and/or the purge door 426 may open to varying degrees based on operational conditions encountered by the aircraft (e.g., the purge door 419 may open to a first angle based on a first speed of the aircraft and open to a second angle based on a second speed of the aircraft, etc.). The degree to which the scupper doors 419 and the purge doors 426 open may vary based on, but not limited to, air speed altitude, free stream pressure, etc. As mentioned above in connection with FIG. 4, the scupper doors 419 may open to a maximum angle of 30 degrees or any other appropriate angle suitable for any of the factors mentioned above. Likewise, the purge doors 426 may open to a maximum angle of 45 degrees or any other appropriate angle suitable for any of the factors mentioned above.

Figure 8C:
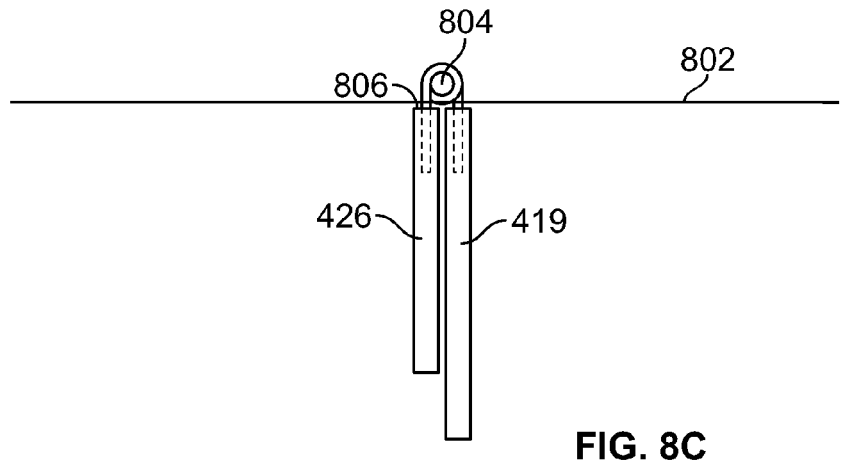
FIG. 8C depicts a top view of the door assembly of FIGS. 8A and 8B in a free state.

FIG. 8C depicts a top view of the door assembly 404 of FIGS. 8A and 8B in its free state. In this example, the doors 419, 426 default to an open state based on the biasing of the springs 806. While the doors 419, 426 are depicted as being biased into the opened state, they may also be biased into the closed state (e.g., the control rods 808, 810 push the doors 419, 426 away from the default closed state).

Figure 9:
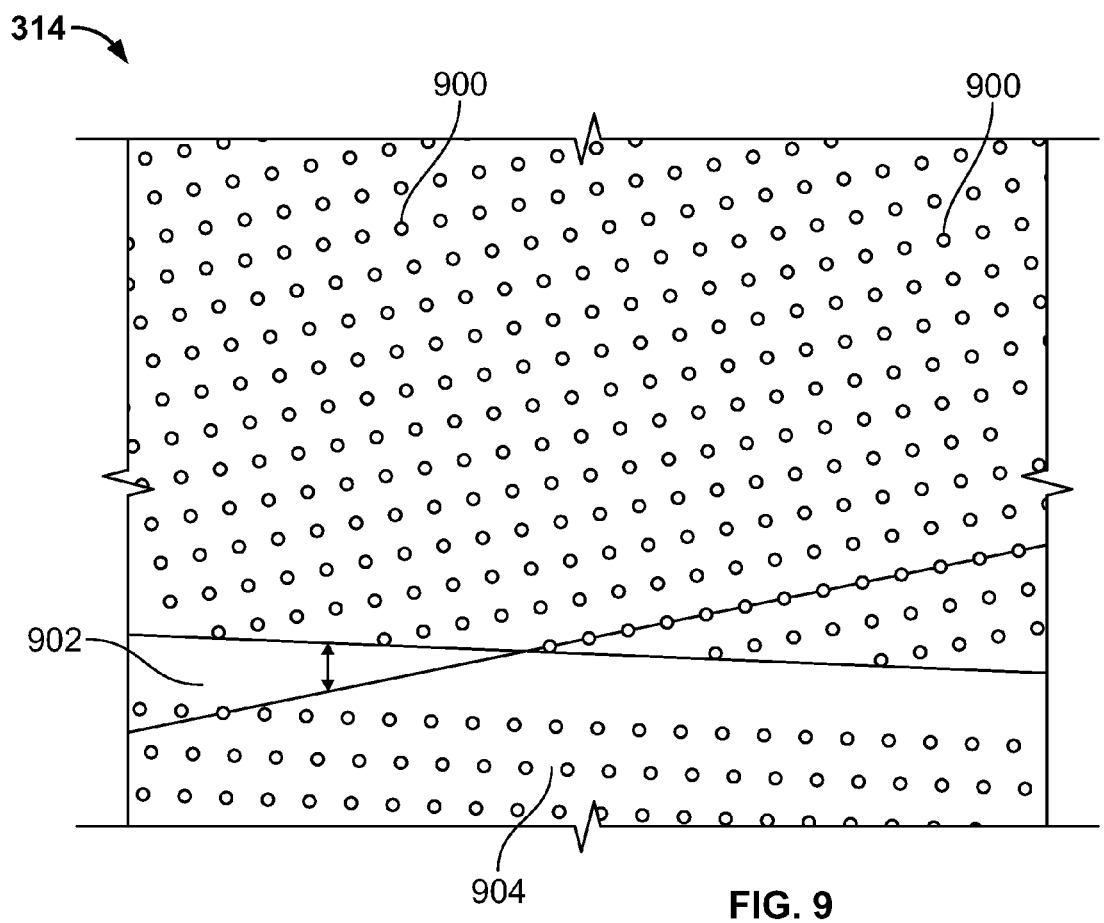
FIG. 9 is an enlarged view of the perforations of the ruled surface of the vertical fin of FIG. 3.

FIG. 9 is an enlarged view of perforations 900 of the ruled surface 314 of the vertical fin 310 of FIG. 3. The perforations 900 may be created by laser-cutting the ruled surface 314 and each perforation 900 may have a diameter of approximately 0.0025" or any other appropriate size based on factors including laminar flow control system 300 performance, manufacturability, surface conditions, etc. The ruled surface 314 may also have portions 902 where few or no perforations are present. The surface may also have portions 904 where the direction of the perforation patterns change in relation to other portions. The use of these features may vary based on optimization, conditions of use, etc. The ruled surface 314 may be made of titanium or any other suitable material. The ruled surface 314 may also be further reinforced through any appropriate means including but not limited to additional layers and ribbing, etc. Also, a nano-coating may be applied to the ruled surface 314 to improve corrosion resistance and, thus, reduce potential servicing of the ruled surface 314. Additionally or alternatively, the nano-coating may be also applied to the front surface of the aux spar 312 (shown in FIG. 3). Additionally, the coating may also improve the performance of the laminar flow control system 300 by preventing particles from being trapped in the perforations 900 by preventing the bonding of the particles to the perforations of the ruled surface 314.

Figure 10:
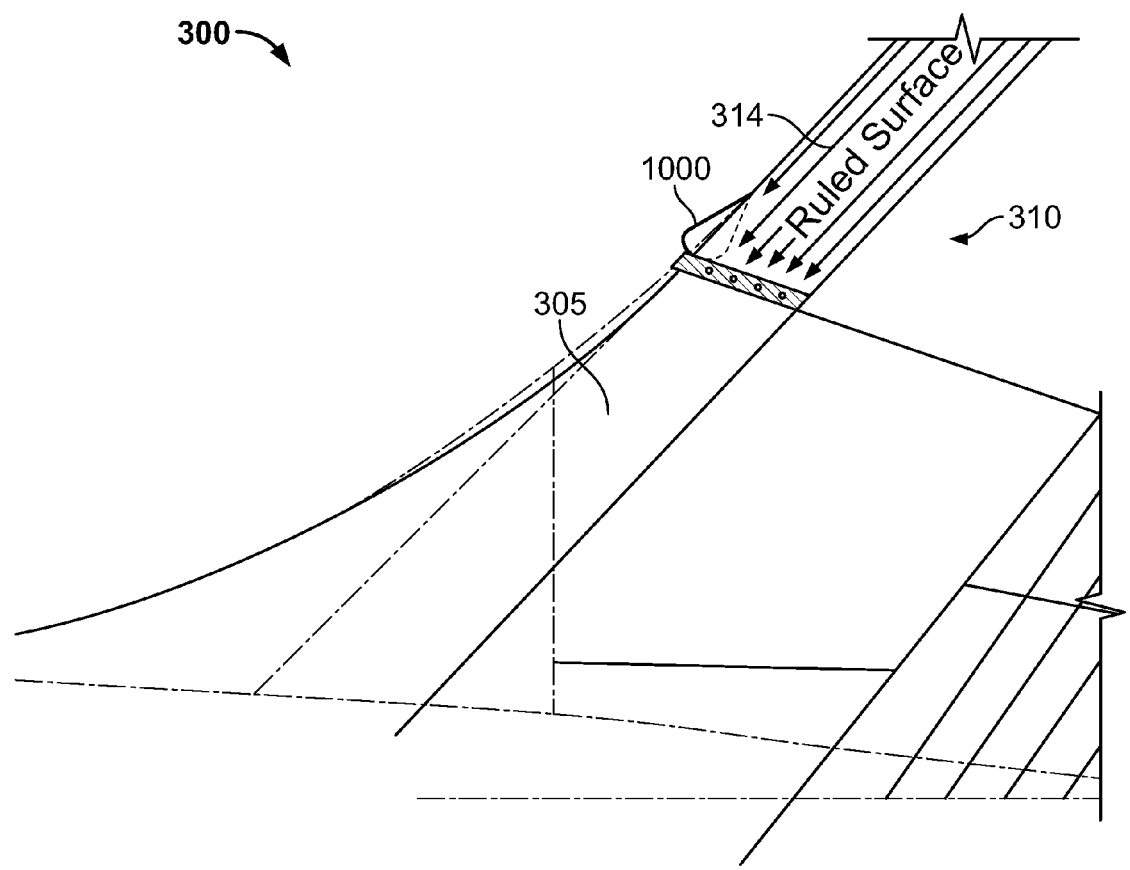
FIG. 10 is a view of the vertical fin and the dorsal fairing of the example laminar flow control system of FIG. 3.

FIG. 10 is a view of the vertical fin 310 and the dorsal fairing 305 of the example laminar flow control system of FIG. 3. In this example, the vertical fin 310 has a gaster bump 1000. The gaster bump 1000 may be formed on the ruled surface 314 to substantially eliminate turbulence. Alternatively, the gaster bump 1000 may be a separate piece welded to the ruled surface (e.g., formed separately then welded and smoothed at the joints) or bolted onto either the vertical fin 310 or the dorsal fairing 305. This method of substantial elimination of the turbulence in addition to the lengthening of the perforated area of the ruled surface 314 (described in connection with FIG. 3) and the addition of the nano-coating (described in connection with FIG. 9) may substantially improve the overall performance of the laminar flow control system 300.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While aircraft are described, the example apparatus may be applied to vehicles, aerodynamic structures, etc.

What is claimed is:
1. An apparatus comprising:
an outboard structure of an aircraft;
a first door assembly on a first side of the outboard structure having a first door defining a first opening;

a second door assembly on a second side of the outboard structure having a second door defining a second opening;

a perforated surface proximate a leading edge of the outboard structure; and an actuator disposed in the aircraft, wherein the actuator drives first and second linkages that couple the first and second door assemblies to the actuator, the first and second linkages to operate the first and second doors, respectively, in an open mode in which the first and second openings create an airflow path between the perforated surface and the first and second openings.

2. The apparatus as defined in claim 1, wherein the actuator comprises one of a hand crank, a solenoid, or a servo.

3. The apparatus as defined in claim 1, further comprising a camera in the outboard structure to monitor operation of at least one of the first or second door assemblies.

4. The apparatus as defined in claim 1, wherein the airflow path comprises a first airflow path, and further comprising a third door of the first door assembly defining a third opening and a fourth door of the second door assembly defining a fourth opening, the third and fourth doors create a second airflow path different from the first airflow path between the perforated surface and the third and fourth openings.

5. The apparatus as defined in claim 4, further comprising a second actuator coupled to third and fourth linkages to operate the third and fourth doors, respectively, wherein the third and fourth doors are to be operated simultaneously by the second actuator.

6. The apparatus as defined in claim 1, wherein at least one of the first or second linkages comprises a rack and pinion.

7. The apparatus as defined in claim 1, wherein the outboard structure comprises a fin, and further comprising a nano-coating on at least one of the perforated surface and a front surface of an auxiliary spar of the fin proximate the leading edge.

8. The apparatus as defined in claim 1, wherein at least one of the first and second doors comprise fiberglass.

9. An apparatus comprising:

an outboard structure of an aircraft having first and second sides;

a perforated surface defining an opening and proximate a leading edge of the outboard structure;

a first actuator disposed in the aircraft and operatively coupled to a first linkage, wherein the first linkage is coupled to a first door on the first side and a second door on the second side, the first and second doors configured to operate in a first mode when open;

a second actuator coupled to a second linkage, wherein the second linkage is coupled to a third door on the first side and a fourth door on the second side, the third and fourth doors configured to operate in a second mode when open, the first and second actuators to control the first and second linkages, respectively, the first mode defining a suction airflow path between the perforated surface and the first and second doors, the second mode defining a purge airflow path between the third and fourth doors and the perforated surface.

10. The apparatus as defined in claim 9, wherein at least one of the first or second actuators is disposed in a fuselage of the aircraft.

11. The apparatus as defined in claim 9, wherein the first or second actuator comprises one of a hand crank, a solenoid or a servo.

12. The apparatus as defined in claim 9, wherein the outboard structure comprises at least one of a horizontal stabilizer, a vertical fin, a wing, or an engine strut.

13. The apparatus as defined in claim 9, further comprising a camera in the outboard structure to monitor operation of the plurality of doors.

14. A method comprising:

determining an operational condition of an aircraft, the aircraft having a first door assembly on a first side of an outboard structure of the aircraft and having a second door assembly on a second side of the outboard structure;

when the operational condition corresponds to a first condition, causing a first actuator to operate a first door of the first door assembly and a second door of the second door assembly in a first mode, the first mode defining first openings in a first direction to define a purge airflow path from the first openings and through a perforated surface to purge the perforated surface; and when the operational condition corresponds to a second condition, causing a second actuator to operate a third door of the first door assembly and a fourth door of the second door assembly in a second mode, the second mode defining second openings in a second direction to define a suction airflow path from the perforated surface to the second openings.

15. The method as defined in claim 14, wherein the first condition comprises takeoff of the aircraft and the second condition comprises cruising of the aircraft.

16. The method as defined in claim 14, further comprising monitoring operation of at least one of the first or second door assemblies via a camera in the outboard structure of the aircraft.

17. The method as defined in claim 14, further comprising when the operational condition corresponds to a third condition, keeping the first and second door assemblies closed.

* * * * *